United States Patent
de Bes (10) Patent No.: US 9,860,304 B2
(45) Date of Patent: Jan. 2, 2018

(54) REDUNDANT CAN INTERFACE FOR DUAL ACTUATION SYSTEMS

(71) Applicant: Woodward, Inc., Fort Collins, CO (US)

(72) Inventor: Jacob A. de Bes, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 740 days.

(21) Appl. No.: 14/160,353

(22) Filed: Jan. 21, 2014

(65) Prior Publication Data

US 2015/0207858 A1    Jul. 23, 2015

(51) Int. Cl.
*G06F 15/16*    (2006.01)
*H04L 29/08*    (2006.01)
*H04L 12/40*    (2006.01)
*H04L 12/701*    (2013.01)

(52) U.S. Cl.
CPC ........ *H04L 67/10* (2013.01); *H04L 12/40182* (2013.01); *H04L 45/00* (2013.01); *H04L 2012/40215* (2013.01)

(58) Field of Classification Search
CPC .............. H04L 67/10; H04L 12/40182; H04L 2012/40215; H04L 45/00
See application file for complete search history.

(56) References Cited

U.S. PATENT DOCUMENTS 4,928,097 A    5/1990  Staab et al.
6,111,888 A *  8/2000  Green ................... H04J 3/0652
                                                        370/447
6,631,476 B1  10/2003  Vandesteeg et al.
7,031,263 B1 *  4/2006  Sun ....................... H04L 45/563
                                                        370/216

(Continued)

FOREIGN PATENT DOCUMENTS

DE    102010015455    10/2011
DE    102012000474     7/2013

(Continued)

OTHER PUBLICATIONS

Natrional Instruments, Controller Area Network Overview, Aug. 1, 013, (http://www.ni.com/white-paper/2732/en/).*

(Continued)

*Primary Examiner* — Krisna Lim
(74) *Attorney, Agent, or Firm* — Fish & Richardson P.C.

(57) ABSTRACT

The subject matter of this specification can be embodied in, among other things, an actuator controller that includes a first communication node associated with a first communication address, a first communication port, a second communication port associated with a second communication address, and a router. The router is responsive to messages received at the first communication port and the second communication port to route a first message received at the first communication port and including the first communication address to the first communication node, route a second message received at the first communication port and including the second communication address to the second communication port, and route a third message received at the second communication port and including the first communication address to the first communication node.

18 Claims, 5 Drawing Sheets

(56) References Cited

U.S. PATENT DOCUMENTS

| | | |
|---|---|---|
| 7,961,596 B2 | 6/2011 | Maruyoshi et al. |
| 8,055,826 B2 | 11/2011 | Janssen et al. |
| 2007/0192449 A1 | 8/2007 | Schultze et al. |
| 2010/0146182 A1* | 6/2010 | Gutekunst ......... H04L 12/40032 710/305 |
| 2010/0241325 A1* | 9/2010 | Glatthaar .............. F16H 61/682 701/58 |
| 2011/0022186 A1 | 1/2011 | Davlin et al. |
| 2011/0177896 A1* | 7/2011 | Hanlon ..................... B63B 1/28 474/84 |
| 2012/0259483 A1* | 10/2012 | Villano ................... B64C 13/42 701/3 |
| 2016/0149934 A1* | 5/2016 | Frank ................ H04L 12/40032 726/23 |

FOREIGN PATENT DOCUMENTS

| | | |
|---|---|---|
| DE | 112012005479 | 9/2014 |
| WO | WO2005/053223 | 6/2005 |
| WO | WO2013/004381 | 1/2013 |
| WO | WO2013/099645 | 7/2013 |

OTHER PUBLICATIONS

Charles M. Kozierok, TCP-IP Guide, Sep. 20, 2005.*

Authorized Officer Ainhoa Barrio Baranano, PCT International Search Report and Written Opinion of the International Searching Authority, PCT/US2015/011361, dated Apr. 10, 2015.

Authorized Officer Mineko Mohri, PCT Notification Concerning Transmittal of International Preliminary Report on Patentability, PCT/US2015/011361, dated Aug. 4, 2016 (9 pages).

* cited by examiner

REDUNDANT CAN INTERFACE FOR DUAL ACTUATION SYSTEMS

TECHNICAL FIELD

This invention relates to systems and techniques for providing redundant communications to endpoint devices in controller area networks.

BACKGROUND

Controller area network (CAN) bus is a communications standard that allows a network of devices to communicate with each other. CAN bus is a popular standard for use in aerospace, automotive, maritime, automation, and medical equipment applications. CAN uses a message-based serial bus protocol to connect individual systems and sensors as an alternative to conventional multi-wire looms used in earlier applications. CAN can allow components to communicate on a single or dual-wire networked data bus up to 1 Mbps.

SUMMARY

In general, this document describes systems and techniques for providing redundant communications to endpoint devices in controller area networks.

In a first aspect, an actuator controller includes a first communication node associated with a first communication address, a first communication port, a second communication port associated with a second communication address, and a router. The router is responsive to messages received at the first communication port and the second communication port to route a first message received at the first communication port and including the first communication address to the first communication node, route a second message received at the first communication port and including the second communication address to the second communication port, and route a third message received at the second communication port and including the first communication address to the first communication node.

Various implementations can include some, all, or none of the following features. The actuator controller can include a synchronizer, wherein the router is further responsive receive a fourth message from the synchronizer and route the fourth message to the second port, the fourth message being descriptive of the state of a first actuator, to the router for routing to the second port. The router can be further responsive to route a fifth message, received at the second communication port and comprising state information descriptive of a state of a second actuator, to the synchronizer. The actuator controller can include a synchronizer, wherein the router is further responsive receive a fourth message from the synchronizer and route the fourth message to the first port, the fourth message being descriptive of the state of a first actuator, to the router for routing to the first port. The router can be further responsive to route a fifth message, received at the first communication port and comprising state information descriptive of a state of a second actuator, to the synchronizer. The router can be further responsive to route a broadcast message received at the first communication port to the first node and to the second communication port, and to route the broadcast message received at the second communication port to the first node. The actuator controller can be a controller area network (CAN) bus node, at least one of the first port and the second port can be a CAN bus port, wherein at least one of the first message, the second message, and the third message can be a CAN-format message, and wherein at least one of the first communications address and the second communications address can be a CAN network address.

In a second aspect, a method for providing redundant actuator controller communications includes providing a first actuator controller that includes a first communication node associated with a first communication address, a first communication port, a second communication port associated with a second communication address, and a first router. The method also includes receiving a first message at the first communication port, the first message identifying the first communication address, routing by the first router and based on the first communication address the first message to the first communication node, receiving a second message at the first communication port, the second message identifying a second communication address, and routing by the first router and based on the second communication address the second message to the second communication port.

Various implementations can include some, all, or none of the following features. The method can also include providing a second actuator controller having a second communication node associated with the second communication address, a third communication port, a fourth communication port associated with the first communication address and in communication with the second communication port, and a second router, wherein routing, by the first router and based on the second communication address, the second message to the second communication port further includes providing the second message at the fourth communication port and routing, by the second router and based on the second communication address the second message to the second communication node. The method can include receiving a third message at the third communication port, the third message identifying the second communication address, routing, by the second router and based on the second communication address, the third message to the second communication node, receiving a fourth message at the third communication port, the fourth message identifying the first communication address, routing, by the second router and based on the first communication address, the fourth message to the fourth communication port, providing the fourth message at the second communication port, and routing, by the first router and based on the first communication address, the fourth message to the first communication node. The first actuator controller can also include a first synchronizer and the second actuator controller can also include a second synchronizer in communication with the first synchronizer, and the method can also include providing, by the first synchronizer, synchronization information to the first router, routing, by the first router, the synchronization information to the second communication port, receiving, by the fourth communication port, the synchronization from the second communication port, and routing, by the second router, synchronization information to the second synchronizer. The first actuator controller can include a first synchronizer and the second actuator controller can include a second synchronizer in communication with the first synchronizer, and the method can include providing, by the first synchronizer, synchronization information to the first router, routing, by the first router, the synchronization information to the first communication port, receiving, by the third communication port, the synchronization from the first communication port, and routing, by the second router, synchronization information to the second synchronizer. The method can also include receiving, at the first communication port, a broadcast message, and routing, by the first router, the broadcast message to the first node and to the second communication port. The method can include receiving, at the second communication port, a broadcast message, and routing, by the first router, the broadcast message to the first. The method can include receiving, at the third communication port, a broadcast message, and routing, by the second router, the broadcast message to the second node and to the fourth communication port. The method can also include receiving, at the fourth communication port, a broadcast message, and routing, by the second router, the broadcast message to the second node.

In a third aspect, an actuation control system includes a first actuator controller having a first communication node associated with a first communication address, a first communication port, a second communication port associated with a second communication address, and a first router responsive to messages received at the first communication port and the second communication port. The system also includes a second actuator controller having a second communication node associated with the second communication address, a third communication port, a fourth communication port associated with the first communication address, and a second router responsive to messages received at the third communication port and the fourth communication port. The second communication port is in bidirectional communication with the fourth communication port. The first router is responsive to messages received at the first communication port and the second communication port to route a first message, received at the first communication port and including the first communication address, to the first communication node, route a second message, received at the first communication port and including the second communication address, to the second communication port, and route a third message, received at the second communication port and including the first communication address, to the first communication node. The second router is responsive to messages received at the third communication port and the fourth communication port to route a fourth message, received at the third communication port and including the second communication address, to the second communication node, route a fifth message, received at the third communication port and including the first communication address, to the fourth communication port, and route a sixth message, received at the fourth communication port and including the second communication address, to the second communication node.

Various implementations include some, all, or none of the following features. The first actuator controller can include a first synchronizer and the second actuator controller can include a second synchronizer in communication with the first synchronizer, and wherein the first synchronizer can be configured to provide first synchronization information descriptive of the state of the first actuator controller to the first router for routing to the second communication port and the fourth communication port, the second router being further configured to route the first synchronization information to the second synchronizer, and wherein the second synchronizer can be configured to provide second synchronization information descriptive of the state of the second actuator controller to the second router for routing to the fourth communication port and the second communication port, the first router being further configured to route the second synchronization information to the first synchronizer. The first actuator controller can include a first synchronizer and the second actuator controller can include a second synchronizer in communication with the first synchronizer, and wherein the first synchronizer can be configured to provide first synchronization information descriptive of the state of the first actuator controller to the first router for routing to the first communication port and the third communication port, the second router being further configured to route the first synchronization information to the second synchronizer, and wherein the second synchronizer can be configured to provide second synchronization information descriptive of the state of the second actuator controller to the second router for routing to the third communication port and the first communication port, the first router being further configured to route the second synchronization information to the first synchronizer. The first actuator controller and the second actuator controller can be controller area network (CAN) bus nodes, and the first communication port and the third communication port can be CAN bus ports.

The systems and techniques described here may provide one or more of the following advantages. First, a system can provide redundant communications to CAN nodes. Second, the system can reduce the number of wires, and the weight and cost associated with them, needed to implement redundant CAN communications. Third, the system can offload synchronization and other information exchange between CAN nodes from a central controller and the broader CAN network to the CAN nodes and a local link between the nodes. Fourth, the system can reduce the number of CAN controllers needed per node.

The details of one or more implementations are set forth in the accompanying drawings and the description below. Other features and advantages will be apparent from the description and drawings, and from the claims.

DETAILED DESCRIPTION

Figure 1:
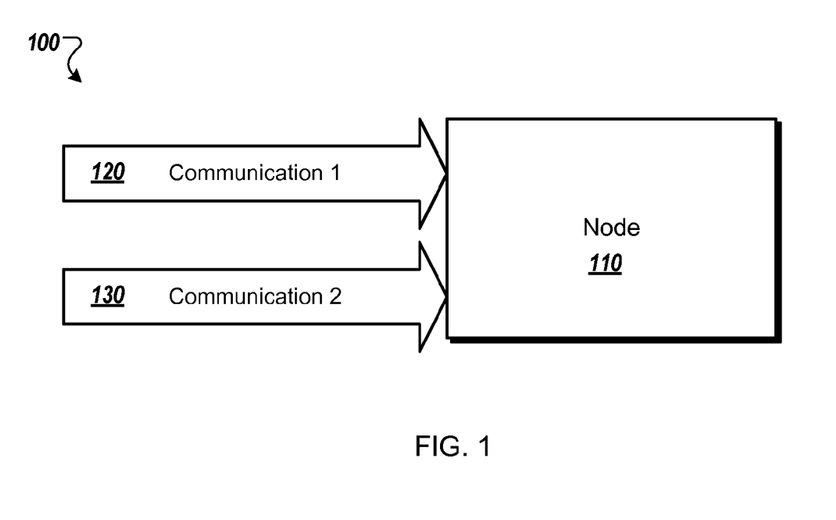
FIG. 1 is a schematic diagram of a prior art configuration for providing redundant communications to a single node.

FIG. 1 is a schematic diagram of a prior art configuration 100 for providing redundant communications to a single node 110. In the illustrated configuration, the node 110 is connected to a communication channel 120 and a communication channel 130. In such a configuration, messages to the node 110 can be transmitted over one or both of the communication channels 120, 130. Should the communication channel 120 fail, communications to the node 110 can continue using the channel 130. Likewise, should the communication channel 130 fail, communications to the node 110 can continue using the channel 120.

Figure 2:
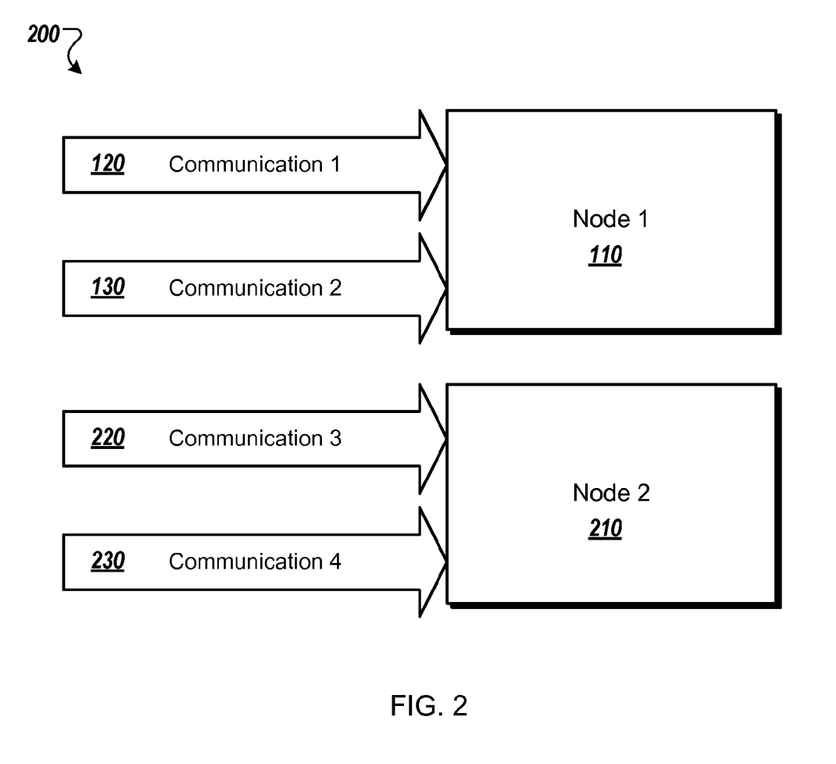
FIG. 2 is a block diagram of a prior art configuration for providing redundant communications to a pair of nodes.

FIG. 2 is a block diagram of a prior art configuration 200 for providing redundant communications to the node 110 and a node 210. Similar to the configuration 100, the node 210 receives redundant communications from a communications channel 220 and a communications channel 230.

In some implementations, two or more nodes (e.g., the nodes 110 and 210) may be used together to provide synchronized or redundant control of actuators or other controllable devices. In some implementations, two or more nodes (e.g., the nodes 110 and 210) may be functionally independent, but located in proximity to each other. In either case, the four communications channels 120, 130, 220, and 230 are needed in order to provide redundant communications to both of the nodes 110, 210. Each communications channel used adds to the cost, weight, space, and complexity of the application in which they are used. For example, in aircraft applications some or all of these factors (e.g., cost, weight, space, and complexity) can have a negative impact on the success of the aircraft application. Additionally, in applications that require synchronized operation of the nodes 110, 210, the use of separate ones of the communications channels 120, 130, 220, and 230 may require synchronization functions to be the responsibility of a central controller. In such implementations, the message-based nature of CAN bus communications and/or latency differences among the communications channels 120, 130, 220, and 230 can negatively impact the synchronicity of the nodes 110, 120. For example, node 110 and node 210 may control two actuators that are mechanically linked (e.g., each cooperatively rotating opposite ends of a common shaft to actuate a single mechanical output). A single controller may have to issue a CAN message to the node 110 to move to a selected position first, and then issue a CAN message to the node 210 to move to the same selected position. In such an example, the node 110 may receive its message first and start moving before the node 210 does, which may cause unwanted stresses along the mechanical link.

Figure 3:
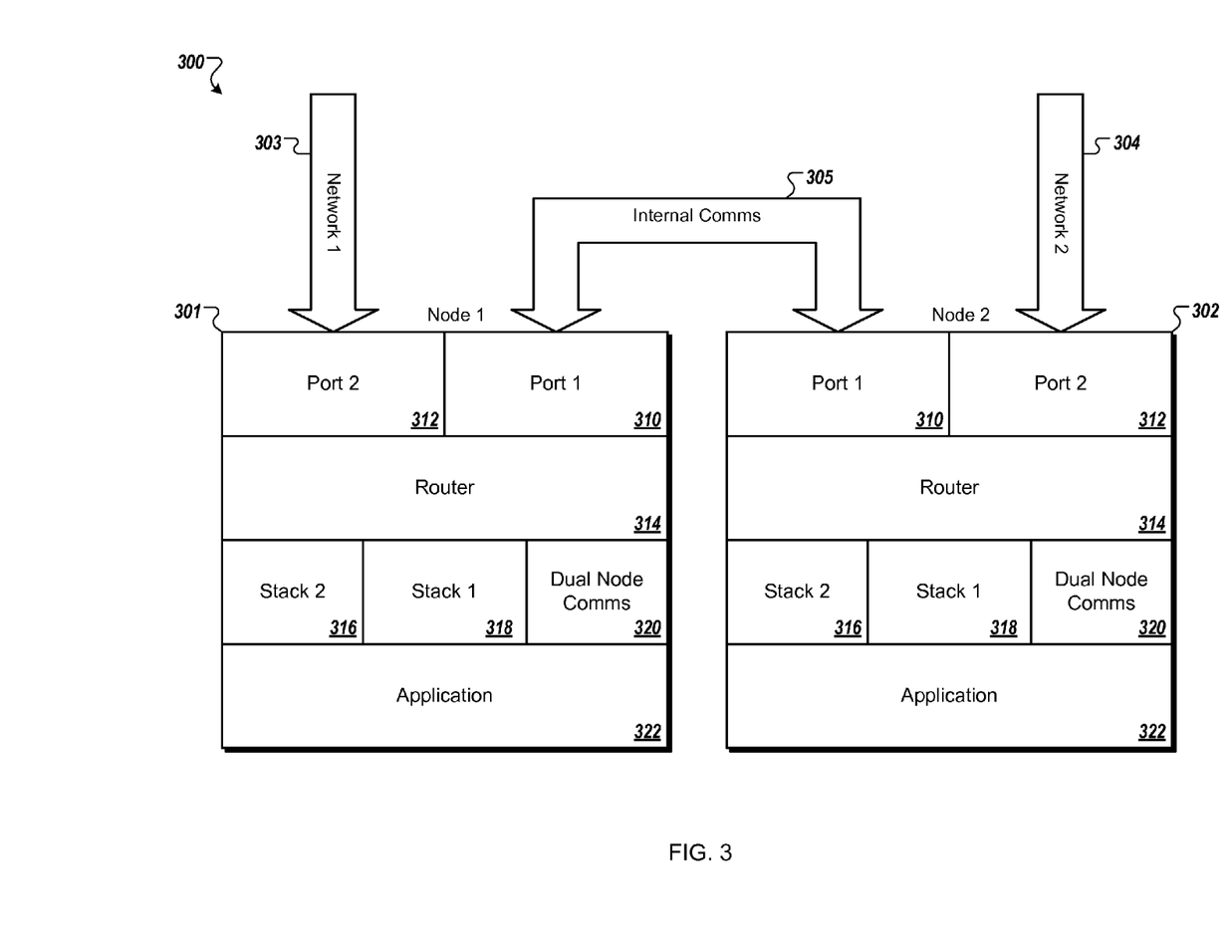
FIG. 3 is a block diagram that shows an example of a system for providing redundant communications to a pair of nodes.

By using virtual channels and router software, redundant communications and synchronization information can be performed. FIG. 3 is a block diagram that shows an example of a system 300 for providing redundant communications to a node 301 and a node 302. In some embodiments, the node 301 and/or the node 302 can be CAN bus endpoints, such as controllable actuators, switches, relays, positioners, sensors, motion controllers, communication bridges or relays, or any other appropriate device that can receive messages from a CAN bus. For example, the nodes 301 and/or 302 can be digital valve positioners, e.g., devices that can control a valve in response to digital commands.

In the example shown, node 301 is configured to receive messages from a network connection 303, and node 302 is configured to receive messages from a network connection 304. Node 301 and node 302 are also configured to communicate with each other over an internal communications connection 305. In some embodiments, one or more of the connections 303-305 can be CAN bus network connections.

Each of the nodes 301, 302 includes a network port 310 and a network port 312. The network ports 310,312 are configured to provide physical and logical connections to network connections, such as the network connections 303, 304, and the internal communications connection 305. In some embodiments, the network port 310 and/or the network port 312 may be CAN bus ports.

As shown in FIG. 3, each of the nodes 301, 302 includes a router 314. The router 314 includes electronic hardware and software for routing network messages received at the network ports 310 and 312, based on network addresses included in the network messages. Network messages arriving at the port 310 and/or the port 312 include network addresses. Some of these messages include the address of node 301, in which case the router 314 of node 301 will route the message to a communication stack 316, a communication stack 318, and/or a dual node communication module 320 of node 301. Similarly, messages arriving at the port 310 of node 302 and including the address of node 302 will be routed by the router 314 of node 301 to a communication stack 316, a communication stack 318, and/or a dual node communication module 320 of node 302.

In the example system shown in FIG. 3, the communication stack 316 and the communication stack 318 are software layers that implement the protocol of the communications network that is in use. The communication stack 316 and the communication stack 318 process network messages from the network protocol format into a form that an application module 322 can accept (e.g., commands sent through the network connections 303 or 304 to be performed by the nodes 301 or 302). In some embodiments, the communication stack 316 and/or the communication stack 318 can be a CAN bus network communications stack.

In the example system shown in FIG. 3, the application module 322 is a software layer that accepts the network messages processed by the communications stacks 316, 318. For example, node 301 may be a digital valve positioner and a network message may be a command to open a valve from a closed position to a fully open position. The communication stacks 316, 318 can process the message to extract a "100%" command from the message, and provide it to the application module 322. The application module 322 may respond by sending appropriate electrical signals to cause a motor or other actuator to move a corresponding valve to a position that would fully open the valve (e.g., 100%).

In the example system shown in FIG. 3, the routers 314 also provide part of a path for redundant communications for the nodes 301 and 302. As discussed above, network messages arriving at the port 310 and/or the port 312 include network addresses. Messages arriving at the port 312 of node 301 can include the address of node 302, in which case the router 314 of node 301 will recognize that the message is not addressed to node 301 and respond by routing the message to the port 310. The message travels across the internal communications connection 305 to the port 312 of node 302. The router 314 of node 302 identifies that the message includes the address of node 302 and routes the message to the stack 316, the stack 318, and/or the dual node communication module 320 of node 301. Similarly, messages arriving at the port 310 of node 302 can include the address of node 301, in which case the router 314 of node 302 will recognize that the message is not addressed to node 302 and respond by routing the message to port 312. The message travels across the internal communications connection 305 to port 310 of node 301. The router 314 of node 301 identifies that the message includes the address of node 301 and routes the message to the stack 316, the stack 318, and/or the dual node communication module 320 of node 301.

The configuration of the nodes 301, 302 and the internal communications connection 305 provide both of the nodes 301, 302 with redundant communications. Messages for both of the nodes 301, 302 can be provided over both of the network connections 303 and 304. Messages arriving at one of the nodes 301, 302 and meant for that node will be routed to and are handled by that node, and messages arriving at one of the nodes 301, 302 and not meant for that node, will be routed to the other node. In such configurations, one of the network connections 303 or 304 can be interrupted, and messages can still be transmitted to both of the nodes 301, 302 over the remaining one of the network connections 303 or 304 and the internal communications connection 305.

In the example system shown in FIG. 3, the router 314 and the stacks 316, 318 are configured to handle redundant messages. For example, a message addressed to node 301 can be transmitted redundantly over both of the network connections 303 and 304. Such messages arriving at the port 312 of node 301 will be provided to the router 314 of node 301 for routing within node 301, and similar messages will arrive at the port 310 of node 302 and be routed to the port 310 of node 301 and the router 314 of node 301 for routing within node 301. In this example, the router 314 of node 301 can have two redundant messages to perform the same function. The router 314 is configured to determine if a message has arrived directly from one of the network connections 303,304 or from the internal communications connection 305 and route the messages that arrived directly, while filtering out redundant messages arriving over the internal communications connection 305. The router 314 will also recognize when a redundant message arrives through the internal communications connection 305 without a corresponding direct message, and route the redundant message within node 301. The router 314 of node 302 is configured to prioritize direct and redundant messages addressed to the node 302 for routing within the node 302.

The dual node communications module 320 performs functions that promote approximately synchronous operation of node 301 and node 302. For example, node 301 and node 302 may be configured to actuate a single mechanical device (e.g., two positioners redundantly moving a single object) or two interrelated devices (e.g., two positioners moving two separate but interrelated objects, such as a fuel valve and an oxidizer valve in a combustor). In some such examples, asynchronous operation of the nodes 301, 302 can cause unwanted mechanical stresses or other undesirable effects (e.g., torque on a common mechanical output, incorrect or dangerous combustion ratios). Referring back to the system 200 of FIG. 2, differences in the arrival times of messages transmitted using the communications channels 120, 130, 220, or 230 can cause corresponding differences in the timing of operations performed by the nodes 110 and 210, possibly leading to unwanted side effects such as those mentioned above.

Referring once again to the example system 300 shown in FIG. 3, the dual node communication module 320 of node 301 and the communication module 320 of node 302 communicate with each other using the internal communications connection 305. For example, a controller can send a command to node 301 to perform a synchronized operation with node 302. The dual communications module 320 of node 301 can process the message and provide the appropriate commands for execution by the application layer 322 of node 301, and send a corresponding message to node 302 through the internal communications connection 305. In some embodiments, synchronicity between node 301 and node 302 may be improved in this way since the internal communications connection 305 may be relatively short compared to the network connections 303 and 304, and can avoid some latency differences introduced by differences between the network connections 303 and 304. In some embodiments, synchronicity between the node 301 and the node 302 may be improved in this way since a synchronous operation can be requested with a single message rather than two sequential messages.

In some implementations, the dual node communications modules 320 can be configured to compensate for latency associated with the internal communications connection 305. For example, use of the internal communications connection 305 may be determined to introduce a 30 ms delay as a message travels from node 301 to node 302. In such examples, the dual node communications modules 320 can be configured to process a synchronous message by passing part of the message to the other node immediately, while delaying execution of the local part of the message by 30 ms to offset the predetermined communications propagation delay.

In some implementations, the dual node communications modules 320 can be configured to provide substantially synchronous operations of nodes 301 and 302 using redundant communications. For example, in the event of a fault in the internal communications connection 305, messages for coordinating the substantially synchronous operations of nodes 301 and 302 can be exchanged over the network connections 303 and 304.

Figure 4:
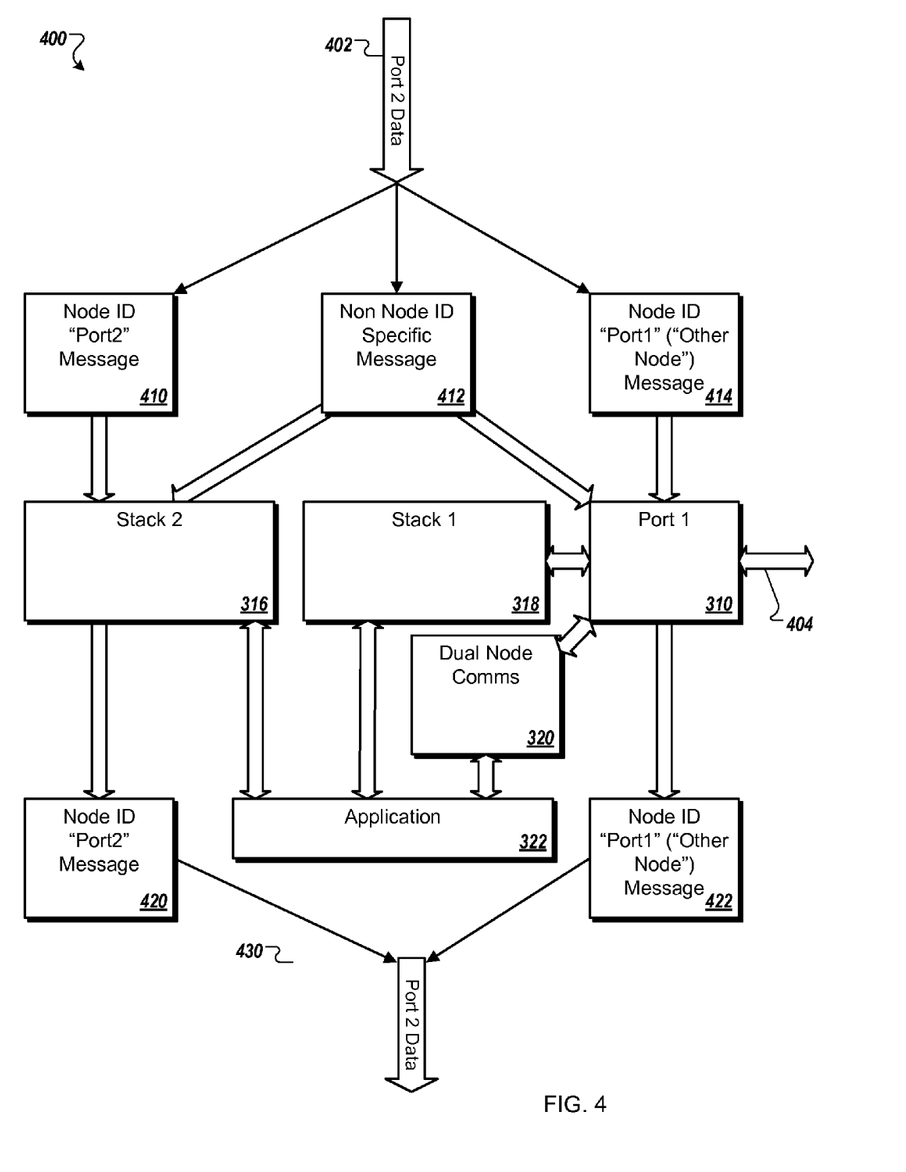
FIG. 4 is a block diagram that shows example communication flows within a node.

FIG. 4 is a block diagram that shows example communication flows 400 within a node. In some implementations, the flows 400 can represent operations performed by the example node 301 or the example node 302 of FIG. 3. Using node 301 as a reference, network messages arriving at the port 312 of node 301 are represented as a collection of port "2" data 402. Network messages arriving at the port 310 of node 301 are represented as a collection of internal message data 404.

The port "2" data 402 can be identified (e.g., by the router 314) as one of at least three types of messages. The data 402 can be identified as a node ID "port2" message 410, e.g., a message intended for execution by node 301. The data 402 can also be identified as a non node ID-specific message 412, e.g., a broadcast message intended for execution by all nodes. The data 402 can also be identified as a node ID "port1" message 414, e.g., a message intended for execution by node 302.

Messages identified as either the node ID "port2" message 410 or the non node ID-specific message 412 are routed to the communications stack 316 and are both processed as a node ID "port2" message 420. The node ID "port2" message 410 and/or the non node ID-specific message 412 are also routed to the application layer 322 for processing. Messages processed by the application layer 322 can be passed back to the communications stack 316 for further handling, e.g., processing as the node ID "port2" message 420.

Messages identified as either the node ID "port1" message 414 or the non node ID-specific message 412 are both routed to the port 310 and to the communications stack 316. The messages 412 and 414 are provided as the internal message data 404, e.g., for transmission over the internal communications connection 305 to the node 302.

Messages arriving as the internal message data 404 at the port 310 are routed to and are handled as a node ID "port1" message 422. The message 422 is provided as a port "2" data message 430, e.g., a message intended for execution by node 302. The node ID "port1" message 414 and/or the non node ID-specific message 412 are also routed to the application layer 322 for processing. Messages processed by the application layer 322 can be passed back to the communications stack 318 for further handling, e.g., processing as the node ID "port1" message 422.

The dual node communications module 320 can send and receive messages from the application layer 322 and the port 310. For example, the application layer 322 can provide messages to the dual node communications module 320 for processing (e.g., to coordinate a substantially synchronous operation with the node 302) and provide the processed messages to port 310. In another example, messages can arrive at port 310 and be provided to the dual node communications module 320 for processing before being passed to the application layer 322 (e.g., to substantially synchronize operations of the node 301 with operations of the node 302).

Figure 5:
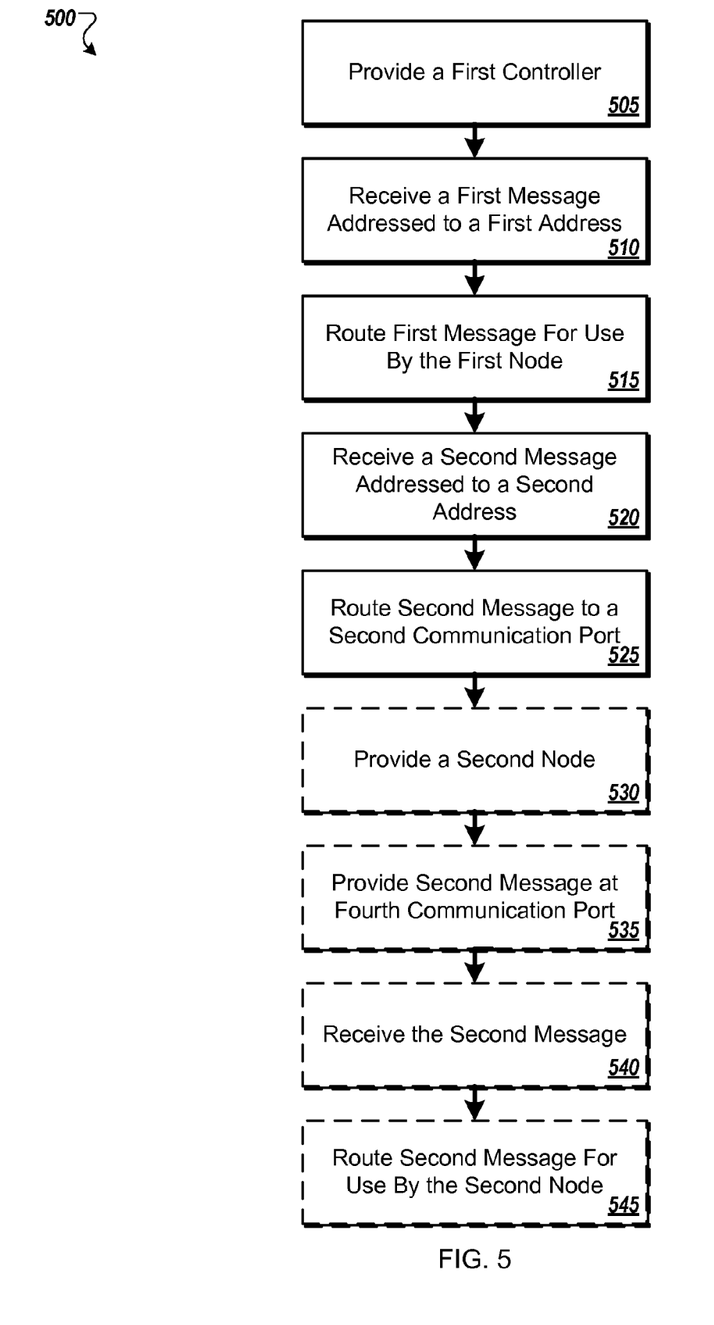
FIG. 5 is a flow diagram that shows an example process for providing redundant communications to a pair of nodes.

FIG. 5 is a flow diagram that shows an example process 500 for providing redundant communications to a pair of nodes. In some implementations, the process 500 can be performed by the example system 300 of FIG. 3. The process 500 begins when a first actuator controller is provided (505). In some embodiments, the actuator controller can be the node 301. The first actuator is associated with a first communication address, e.g., a CAN network address, and includes a router such as the router 314, a first port such as the port 312, and a second port such as the port 310.

A first message is received (510) at the first communications port. For example, the first message can be received at the port 312. The first message identifies the first communications address.

The first message is routed (515) by the router to the first communication node based on the first communication address. For example, network messages addressed to the node 301 can be routed for execution by node 301.

A second message is received (520) at the first communications port. For example, the second message can be received at the port 312. The second message identifies a second communications address, e.g., the address of the node 302.

The second message is routed (525) by the router to the second communication port based on the second communication address. For example, network messages not addressed to node 301 can be routed to the port 310.

In some embodiments, a second actuator controller, such as node 302, can be provided (530). The second actuator controller can include a second communication node associated with the second address, e.g., the address of node 302, a third communication port such as the port 310 of node 302, and a fourth communication for such as the port 312 of node 302.

The second message can be provided (535) at the fourth communication port. The second message can be received (540) at the fourth communication port and routed (545) by the second router to the second communication node based on the second communication address. For example, the second message can include the address of the second node 302, and the router 314 of node 302 can identify and route the second message for execution by node 302.

In some implementations, messages addressed to the second actuator controller and arriving at the second actuator controller can be routed for execution by the second actuator controller, while messages arriving at the second actuator controller and not addressed to the second actuator controller can be routed to the first actuator controller. For example, messages addressed to and arriving at node 302 can be executed by node 302, while messages not addressed to and arriving at node 302 can be forwarded to node 301.

Figure 6:
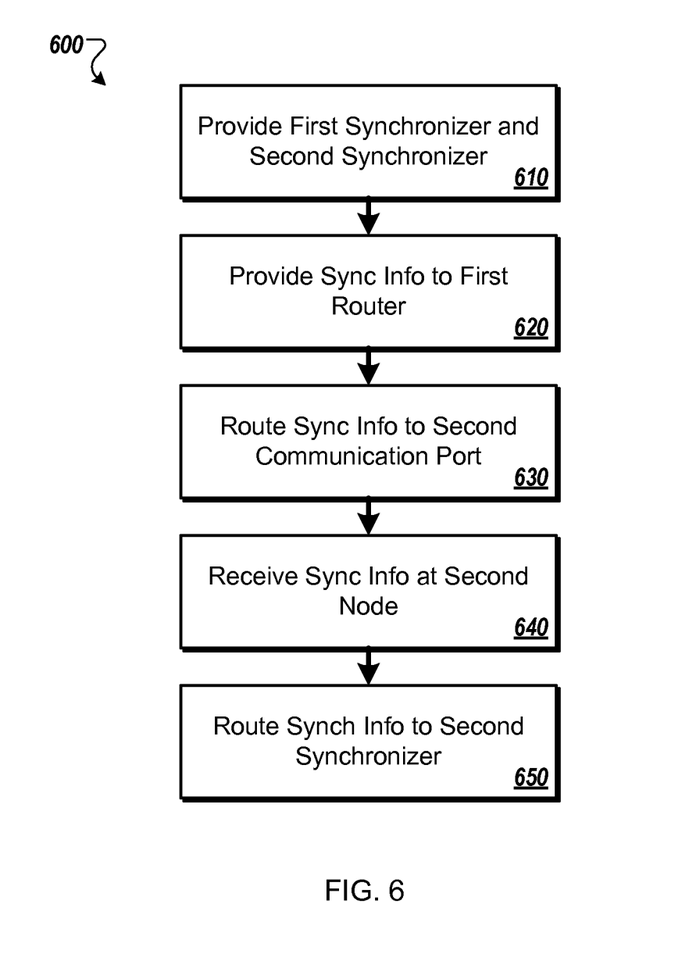
FIG. 6 is a flow diagram that shows an example process for sharing synchronization information between a pair of nodes.

FIG. 6 is a flow diagram that shows an example process 600 for sharing synchronization information between a pair of nodes. In some implementations, the process 600 may be performed by the example system 300 of FIG. 3. In some implementations, the process 600 may be performed instead of, or in addition to, the example process 500 of FIG. 5.

The process 600 begins when a first synchronizer and a second synchronizer are provided (610). For example, the dual node communications module 320 of node 301 and the dual node communications module 320 of node 302 can be provided.

The first synchronizer provides (620) synchronization information to a first router. In some implementations, the first router can be the router 314 of node 301. The first router routes (630) the synchronization information to a second communication port. In some embodiments, the second communication port can be the port 310 of node 301.

The synchronization information is received (640) by a fourth communication port. For example, the synchronization information can be received by the port 312 of node 302. The synchronization information is routed (650) by a second router to the second synchronizer. For example, the synchronization information can be routed by the router 314 of node 302 to the dual node communications module 320. In some implementations, the synchronization information can include timing and/or state information about node 301 that can be used to synchronize operations of node 302 with those of node 301.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. All references to various aspects of the Figures are examples only.

What is claimed is:

1. An actuator controller comprising:
   a first controller area network (CAN) bus communication node associated with a first CAN node communication address that identifies the first CAN bus communication node and comprising:
   a first CAN bus communication port;
   a second CAN bus communication port associated with a second CAN node communication address that identifies another CAN bus communication node; and
   a router responsive to CAN-format messages received at the first CAN bus communication port and the second CAN bus communication port to:
   receive a first CAN-format message, including the first CAN node communication address, at the first CAN bus communication port and route the first CAN-format message to the first CAN bus communication node;
   receive a CAN-format second message, including the second CAN node communication address, at the first CAN bus communication port and route the second CAN-format message to the second CAN bus communication port; and
   receive a third CAN-format message, including the first CAN node communication address, at the second CAN node communication port and route the third CAN-format message to the first CAN bus communication node.

2. The actuator controller of claim 1, further comprising a synchronizer, wherein the router is further responsive receive a fourth CAN-format message from the synchronizer and route the fourth CAN-format message to the second CAN bus communication port, the fourth CAN-format message being descriptive of the state of a first actuator, to the router for routing to the second CAN bus communication port.

3. The actuator controller of claim 2, wherein the router is further responsive to route a fifth CAN-format message, received at the second CAN bus communication port and comprising state information descriptive of a state of a second actuator, to the synchronizer.

4. The actuator controller of claim 1, further comprising a synchronizer, wherein the router is further responsive receive a fourth CAN-format message from the synchronizer and route the fourth CAN-format message to the first CAN bus communication port, the fourth CAN-format message being descriptive of the state of a first actuator, to the router for routing to the first CAN bus communication port.

5. The actuator controller of claim 4, wherein the router is further responsive to route a fifth CAN-format message, received at the first CAN bus communication port and comprising state information descriptive of a state of a second actuator, to the synchronizer.

6. The actuator controller of claim 1, wherein the router is further responsive to route a broadcast CAN-format message received at the first CAN bus communication port to the first CAN bus communication node and to the second CAN bus communication port, and to route the broadcast CAN-format message received at the second CAN bus communication port to the first CAN bus communication node.

7. A method for providing redundant actuator controller communications, the method comprising:
    providing a first actuator controller comprising:
        a first controller area network (CAN) bus communication node associated with a first CAN node communication address that identifies the first CAN bus communication node;
        a first CAN bus communication port;
        a second CAN bus communication port associated with a second CAN node communication address that identifies another CAN bus communication node; and
        a first router responsive to CAN-format messages received at the first CAN bus communication port and the second CAN bus communication port;
    receiving a first CAN-format message at the first CAN bus communication port, the first CAN-format message identifying the first CAN node communication address;
    routing, by the first router and based on the first CAN node communication address, the first CAN-format message, including the first CAN node communication address, to the first CAN bus communication node;
    receiving a second CAN-format message at the first CAN bus communication port, the second CAN-format message identifying the second CAN node communication address; and
    routing, by the first router and based on the second CAN node communication address, the second CAN-format message, including the second CAN node communication address, to the second CAN bus communication port.

8. The method of claim 7, further comprising:
    receiving, at the fourth CAN bus communication port, a broadcast CAN-format message; and
    routing, by the second router, the broadcast CAN-format message to the second CAN bus communication node.

9. The method of claim 7, further comprising:
    providing a second actuator controller comprising:
        a second CAN bus communication node associated with the second CAN node communication address;
        a third CAN bus communication port;
        a fourth CAN bus communication port associated with the first CAN node communication address and in communication with the second CAN bus communication port; and
        a second router responsive to CAN-format messages received at the third CAN bus communication port and the fourth CAN bus communication port;
    wherein routing, by the first router and based on the second CAN node communication address, the second CAN-format message to the second CAN bus communication port further comprises:
    providing the second CAN-format message at the fourth CAN bus communication port; and
    routing, by the second router and based on the second CAN node communication address the second CAN-format message, including the second CAN node communication address, to the second CAN bus communication node.

10. The method of claim 9, further comprising:
    receiving a third CAN-format message at the third CAN bus communication port, the third CAN-format message identifying the second CAN node communication address;
    routing, by the second router and based on the second CAN node communication address, the third CAN-format message, including the second CAN node communication address, to the second CAN bus communication node;
    receiving a fourth CAN-format message at the third CAN bus communication port, the fourth CAN-format message identifying the first CAN node communication address;
    routing, by the second router and based on the first CAN node communication address, the fourth CAN-format message, including the first CAN node communication address, to the fourth CAN bus communication port;
    providing the fourth CAN-format message at the second CAN bus communication port; and
    routing, by the first router and based on the first CAN node communication address, the fourth CAN-format message, including the first CAN node communication address, to the first CAN bus communication node.

11. The method of claim 10, the first actuator controller further comprising a first synchronizer and the second actuator controller further comprising a second synchronizer in communication with the first synchronizer; and
    the method further comprises providing, by the first synchronizer, synchronization information to the first router;
    routing, by the first router, the synchronization information to the second CAN bus communication port;
    receiving, by the fourth CAN bus communication port, the synchronization from the second CAN bus communication port; and
    routing, by the second router, synchronization information to the second synchronizer.

12. The method of claim 10, the first actuator controller further comprising a first synchronizer and the second actuator controller further comprising a second synchronizer in communication with the first synchronizer; and
    the method further comprises providing, by the first synchronizer, synchronization information to the first router;
    routing, by the first router, the synchronization information to the first CAN bus communication port;
    receiving, by the third CAN bus communication port, the synchronization from the first CAN bus communication port; and
    routing, by the second router, synchronization information to the second synchronizer.

13. The method of claim 7, further comprising:
    receiving, at the first CAN bus communication port, a broadcast CAN-format message; and routing, by the first router, the broadcast CAN-format message to the first CAN bus communication node and to the second CAN bus communication port.

14. The method of claim 7, further comprising:
receiving, at the second CAN bus communication port, a broadcast CAN-format message; and
routing, by the first router, the broadcast CAN-format message to the first CAN bus communication node.

15. The method of claim 7, further comprising:
receiving, at the third CAN bus communication port, a broadcast CAN-format message; and
routing, by the second router, the broadcast CAN-format message to the second CAN bus communication node and to the fourth CAN bus communication port.

16. An actuation control system comprising:
a first actuator controller comprising:
  a first controller area network (CAN) bus communication node associated with a first CAN node communication address that identifies the first CAN bus communication node and comprising:
    a first CAN bus communication port;
    a second CAN bus communication port associated with a second CAN node communication address that identifies another CAN bus communication node; and
    a first router responsive to CAN-format messages received at the first CAN bus communication port and the second CAN bus communication port; and
a second actuator controller comprising:
  a second CAN bus communication node associated with the second CAN node communication address and comprising:
    a third CAN bus communication port;
    a fourth CAN bus communication port associated with the first CAN node communication address; and
    a second router responsive to CAN-format messages received at the third CAN bus communication port and the fourth CAN bus communication port;
wherein the second CAN bus communication port is in bidirectional communication with the fourth CAN bus communication port;
wherein the first router is responsive to CAN-format messages received at the first CAN bus communication port and the second CAN bus communication port to:
  receive a first CAN-format message, including the first CAN node communication address, at the first CAN bus communication port and route the first CAN-format message to the first CAN bus communication node;
  receive a second CAN-format message, including the second CAN node communication address, at the first CAN bus communication port and route the second CAN-format message to the second CAN bus communication port; and
  receive a third CAN-format message, including the first CAN node communication address, at the second CAN bus communication port and route the third CAN-format message to the first CAN bus communication node;

wherein the second router is responsive to CAN-format messages received at the third CAN bus communication port and the fourth CAN bus communication port to:
  receive a fourth CAN-format message, including the second CAN node communication address, at the third CAN bus communication port and route the fourth CAN-format message to the second CAN bus communication node;
  receive a fifth CAN-format message, including the first CAN node communication address, at the third CAN bus communication port and route the fifth CAN-format message to the fourth CAN bus communication port; and
  receive a sixth CAN-format message, including the second CAN node communication address, at the fourth CAN bus communication port and route the sixth CAN-format message to the second CAN bus communication node.

17. The system of claim 16, wherein the first actuator controller further comprises a first synchronizer and the second actuator controller further comprises a second synchronizer in communication with the first synchronizer; and
wherein the first synchronizer is configured to provide first synchronization information descriptive of the state of the first actuator controller to the first router for routing to the second CAN bus communication port and the fourth CAN bus communication port, the second router being further configured to route the first synchronization information to the second synchronizer; and
wherein the second synchronizer is configured to provide second synchronization information descriptive of the state of the second actuator controller to the second router for routing to the fourth CAN bus communication port and the second CAN bus communication port, the first router being further configured to route the second synchronization information to the first synchronizer.

18. The system of claim 16, wherein the first actuator controller further comprises a first synchronizer and the second actuator controller further comprises a second synchronizer in communication with the first synchronizer; and
wherein the first synchronizer is configured to provide first synchronization information descriptive of the state of the first actuator controller to the first router for routing to the first CAN bus communication port and the third CAN bus communication port, the second router being further configured to route the first synchronization information to the second synchronizer; and
wherein the second synchronizer is configured to provide second synchronization information descriptive of the state of the second actuator controller to the second router for routing to the third CAN bus communication port and the first CAN bus communication port, the first router being further configured to route the second synchronization information to the first synchronizer.

* * * * *

UNITED STATES PATENT AND TRADEMARK OFFICE
CERTIFICATE OF CORRECTION

PATENT NO.            : 9,860,304 B2                                          Page 1 of 1
APPLICATION NO.       : 14/160353
DATED                 : January 2, 2018
INVENTOR(S)           : Jacob A. de Bes It is certified that error appears in the above-identified patent and that said Letters Patent is hereby corrected as shown below:

On the Title Page

Under Other Publications, Line 1, please replace "Natrional" with -- National --

Signed and Sealed this
Eighteenth Day of September, 2018

Andrei Iancu
*Director of the United States Patent and Trademark Office*